United States Patent [19]

Hess

[11] Patent Number: 4,458,868

[45] Date of Patent: Jul. 10, 1984

[54] ARRANGEMENT FOR THE STRESS-FREE MOUNTING OF SHAFT FOR THE ELEVATIONAL MOVEMENT OF AN OPTICAL DEVICE

[75] Inventor: Willy Hess, Oberrieden, Switzerland

[73] Assignee: Contraves AG, Zürich, Switzerland

[21] Appl. No.: 220,508

[22] Filed: Dec. 29, 1980

[30] Foreign Application Priority Data

Feb. 1, 1980 [CH] Switzerland ............................ 831/80

[51] Int. Cl.³ ............................................ F16M 11/12
[52] U.S. Cl. .................................................. 248/183
[58] Field of Search ....................... 248/183, 185, 291; 356/130; 33/281, 282

[56] References Cited

U.S. PATENT DOCUMENTS

| | | | |
|---|---|---|---|
| 1,300,805 | 4/1919 | Akeley | 248/183 |
| 2,531,252 | 11/1950 | Brunson | 248/185 X |
| 2,719,457 | 10/1955 | Tripp | |
| 3,180,603 | 4/1965 | O'Connor | 248/183 |
| 3,386,694 | 6/1968 | Boyle | 248/183 |

FOREIGN PATENT DOCUMENTS

| | | |
|---|---|---|
| 2234808 | 1/1975 | France . |
| 345204 | 4/1960 | Switzerland . |
| 1043686 | 9/1966 | United Kingdom . |

Primary Examiner—Francis K. Zugel
Attorney, Agent, or Firm—Werner W. Kleeman

[57] ABSTRACT

At a flight trajectory measuring and observation theodolite there is mounted between two spaced housings a telescope and additionally laterally at the housings further optical devices and by means of a motor driven shaft can be pivoted about a common elevational axis. For the stress-free mounting of the shaft which is fixedly connected for rotation with an inner ring or race of a roller bearing, the outer race or ring thereof is connected by means of a flange portion with a wall. This wall, viewed in axial direction, is provided with at least three radially effective spring elements and the wall is radially inwardly directed and provided with an opening. The spring elements separated by a slot are uniformly distributively arranged at the circumference of the opening and are bounded by an arc corresponding to the inner surface or side of the opening, the center of such arc being located at the axis of rotation of the shaft.

7 Claims, 4 Drawing Figures

ARRANGEMENT FOR THE STRESS-FREE MOUNTING OF SHAFT FOR THE ELEVATIONAL MOVEMENT OF AN OPTICAL DEVICE

BACKGROUND OF THE INVENTION

The present invention relates to an improved arrangement for the stress-free mounting of a shaft for the elevational movement of an optical device.

Generally speaking, the arrangement of the present invention comprises a shaft which is mounted in a first housing and is motor driven and is rigidly connected for rotation with the inner race or ring of a roller bearing. This shaft serves for the elevational movement of an optical device arranged between the first housing and a second housing. The optical device is pivotable about the lengthwise axis of the shaft. Such optical device especially may be constituted by the telescope of a flight trajectory measuring and observing theodolite.

In Swiss Pat. No. 474,047 there is known to the art a measuring theodolite wherein between two spacedly arranged housings secured at a yoke element there is provided a telescope which is pivotably mountable about a horizontally aligned elevation axis. At the sides of the housing there is selectively additionally arranged one or more optical receivers for infrared, laser or other radiation as well as a telescopic sight. The elevational movement of the telescope, the receivers and the objective of the telescopic sight is accomplished by a motor driven shaft mounted in the housings.

Further belonging to the state-of-the-art is Swiss Pat. No. 345,204 wherein for the purpose of taking-up radial symmetrical forces between the outer race or ring of a roller bearing seated upon a shaft and the inner wall of a bore there is arranged a spring elastic intermediate element. Also there is known from British Pat. No. 1,043,686 an arrangement wherein for taking-up radially effective forces there is provided between the outer race or ring of a roller bearing seated upon a shaft and the inner wall of a bore provided in a housing a gap and to both sides of the roller bearing a respective spring ring which is attached at the outer ring or race as well as at the housing. Finally, in French Pat. No. 2,234,808 there is disclosed an arrangement for the elastic mounting of a body of rotation driven essentially by a motor, for instance an intermediate element formed of radially spacedly arranged segment-like constructed ring elements interconnected with one another by webs.

SUMMARY OF THE INVENTION

It is a primary object of the present invention to provide a new and improved construction of an arrangement for the stress-free mounting of a shaft for the elevational movement of an optical device in a manner not associated with the drawbacks and limitations of the prior art proposals.

Another and more specific object of the present invention aims at mounting a shaft in a housing such that the stresses arising during operation by virtue of extreme temperature differences, possibly falling within an operating temperature range of $-25°$ centrigade to $+50°$ centrigade, between the light metal housing and the steel bearing means are not transmitted to the bearing running or travelling surfaces and at that location, due to deformation, causing increased friction or displacement of the aligned elevational axis.

Now in order to implement these and still further objects of the invention, which will become more readily apparent as the description proceeds, the invention of the present development contemplates that the outer race or ring of the roller bearing is arranged by means of a flange portion thereof, viewed in the axial direction of the shaft, laterally at a radially inwardly directed wall of the housing and through which piercingly extends an opening. The flange portion of the outer bearing race is attached at least at three radially effective spring elements which are uniformly distributively arranged at the housing wall.

Due to the attachment and spring elements which are effective as spring rods and arranged at the circumference of the housing wall, there is ensured that both with extreme climatic conditions and also when using different materials having different coefficients of expansion the parts which are to be interconnected with one another—for instance a roller bearing outer ring composed of hardened steel with the wall of the housing formed of light metal—no disturbing forces are transmitted to the bearing. The individual spring elements, depending upon the prevailing temperature range, cause a movement toward the centre or away from the centre, and the spring forces which are directly correlated with the movement are obtained by appropriately dimensioning the spring rods.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
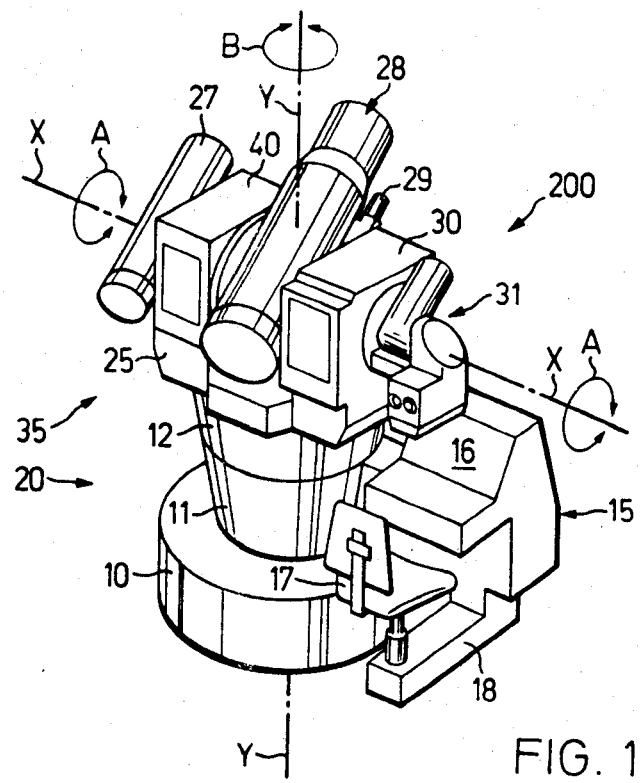
FIG. 1 is a perspective view of a theodolite composed essentially of a measuring part or component and a stand portion.

Describing now the drawings, in FIG. 1 there is shown in perspective view a target tracking and target measuring device, especially a recording or motion-picture theodolite 200 which essentially comprises a stand portion or part 20 and a measuring portion or part 35.

The stand portion 20 encompasses a stationary socket element 10 attached at a not particularly illustrated foundation, a rotatable stand element 11 and an intermediate element 12. Arranged laterally at the stand element 11 is an alignment stand 15 essentially consisting of an operating console or panel 16, a seat 17 and a foot platform 18. The alignment stand 15 is secured by any suitable fastening means to the stand element 11. This stand element 11 along with the alignment stand 15 as well as the measuring part 35 are rotatable in relation to the stationary socket element 10 by means of a respective appropriately arranged but not particularly shown conventional drive unit, for movement in the direction of the double-headed arrow B of FIG. 1 about a vertical axis Y—Y. The rotational movement of the measuring portion or part 35 in relation to the rotational movement of the alignment or aligning stand 15 is preferably accomplished as a synchronous movement.

The measuring part 35 comprises a yoke element 25 upon which there are arranged in spaced relationship from one another a first housing block or housing 40 and a second housing block or housing 30 secured by not particularly illustrated attachment means. Provided laterally at the first housing block 40 is preferably an optical receiver or transmitter 27 for infrared, laser, visible or other radiation. Between both first and second housings 40 and 30 there is arranged and pivotably mounted a telescope 28. Laterally at the second housing 30 there is provided a telescopic sight 31 operatively associated with the alignment or aligning stand 15. At the telescope tube 28' of the telescope 28 and which is pivotably mounted between both of the housings 30 and 40 there is preferably arranged and attached a television camera 29 at the side confronting the housing 30. By means of the signals (TV- or IR-tracking) received from the TV-camera 29 or the IR-receiver 27 it is possible to control the target tracking of the theodolite 200.

Figure 2:
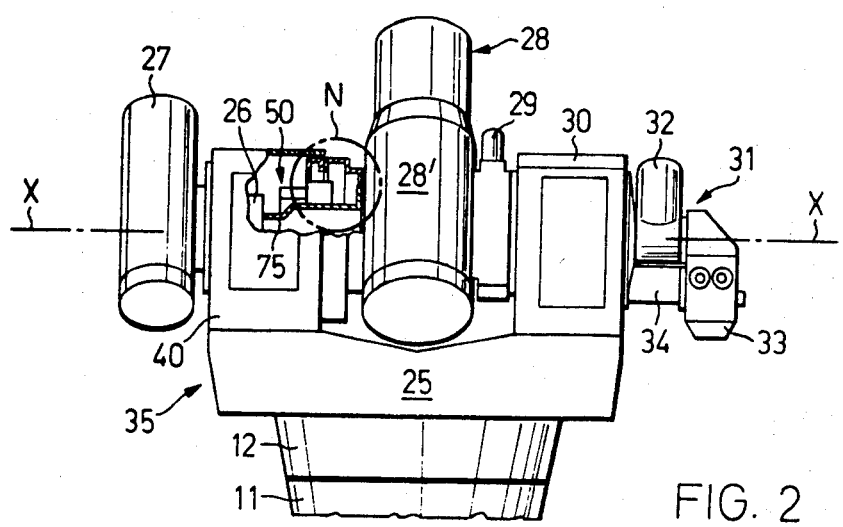
FIG. 2 illustrates the measuring part of the theodolite shown in front view and partially in sectional view in FIG. 1, with a pivotably mounted telescope arrangement between two housing blocks.

In FIG. 2 there is shown in front view and partially in sectional view the measuring portion 35 on an enlarged scale and there will be recognised the IR-receiver 27, an angle measuring device 26 arranged in the housing 40, the housing 40 itself, the telescope 28 with the TV-camera 29, the housing 30 for receiving the not particularly shown optical elements and the telescopic sight 31. This telescopic sight 31 essentially consists of a pivotable objective 32, an occular body 33 and a support or carrier body 34 flanged at the housing 30. The support body 34 is preferably of substantially U-shaped configuration and serves to receive and attach the pivotal objective 32.

The receiver 27, the telescope 28 along with the camera 29 as well as the objective 32 mounted between both legs of the support or carrier body 34 are collectively pivotable about a horizontally dispositioned axis, preferably about a common horizontal tilt or pivot axis X—X as shown in FIG. 1. A drive device or unit 50 arranged within the housing 40 causes the elevational movement of the parts 27, 28, 29 and 32 about the tilt or pivot axis X—X in the direction of the double-headed arrow A shown in FIG. 1.

By means of the elevational movement A the angle measuring device 26 is simultaneously driven. This angle measuring device 26 is constructed such that it can generate in the form of electrical output signals, either continuously the momentary elevational position of the telescope 28 in relation to a predetermined reference position, or, however, can produce countable step changes of the elevation angle.

Figure 3:
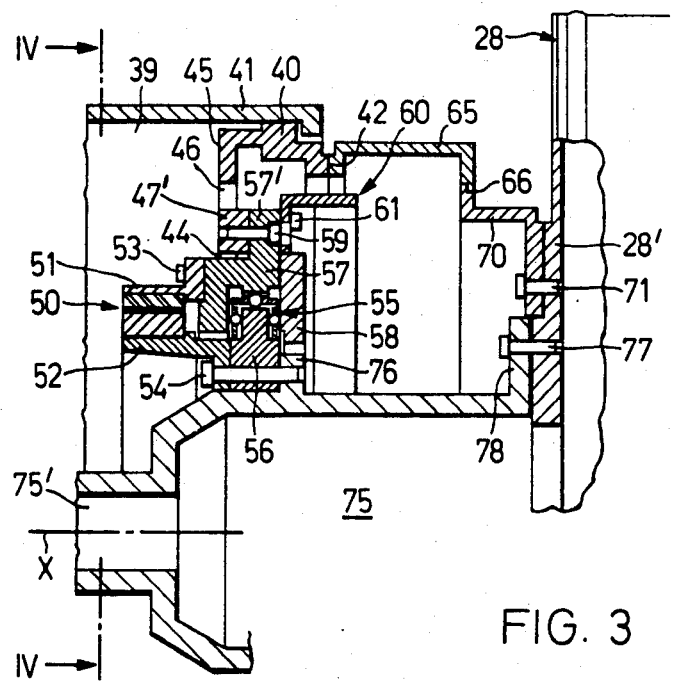
FIG. 3 illustrates a portion in section and on enlarged scale of part of the arrangement of FIG. 2 which has been designated by a circle marked N and encompassing a drive shaft, mounted in the one housing block, and serving for the elevational movement of the telescope.

FIG. 3 illustrates on an enlarged scale and in sectional view the location N confined within the thus marked circle of FIG. 2 and there will be recognised a fragmentary portion of the housing 40 closed at the upper side by a removable cover element or cover 41. Equally, there will be seen a first housing portion 65 which is attached by appropriate fastening means at the end side or face 42 of the housing 40 and a second housing portion 70. This second housing portion 70 is secured by means of threaded bolts 71 or equivalent fastening devices at the telescope tube 28' of the telescope 28 arranged in spaced relationship from the housing 40 and illustrated partially in sectional view. The telescope tube 28' along with the telescope 28 can be pivoted, as shown in FIG. 1, about the horizontal axis X—X in the direction of the double-headed arrow A. Both of the housing portions or parts 65 and 70 are sealed at their joint location 66 by a suitable labyrinth seal arrangement.

Rotatably mounted within the housing 40 is a stepped driven shaft 75. This driven shaft 75 is provided at the side confronting the telescope 28 with a first flange 78 and is rigidly connected for rotation with the telescope tube 28' by means of threaded bolts or screws 77 or the like arranged in distributed fashion about the circumference. In spaced relationship from the first flange 78 there is provided, viewed in axial direction, a further flange 76 constructed for the attachment of the drive elements. In spaced relationship from the end surface 42 constructed as a closure surface for the housing portion 65 the housing 40 possesses an inwardly directed wall 45 through which piercingly extends an opening or aperture 44. A roller bearing 55 is fixedly connected by a flange protion 57' formed at the outer ring or race 57 and by threaded bolts or screws 59 with the wall 45 and is centered and mounted upon the shaft 75 by means of an inner ring or race 56.

The schematically shown roller bearing 55 essentially consists of the outer ring or race 57 and the inner ring or race 56 as well as a ring-shaped disc 58 secured at the outer race 57 and essentially interconnecting both races 56, 57. The ring-shaped disc 58 is connected by appropriate fastening means at the outer ring or race 57. In order to take-up radial and axial bearing forces there is arranged in radial direction between the inner race 56 and the outer race 57 a first schematically illustrated ball track and in axial direction to both sides of the inner race or ring 56 a respective further schematically illustrated ball track positioned at the one side by the outer race 57 and at the other side by the disc 58. The roller bearing 55, by virtue of the particular design and arrangement of the ball tracks arranged in radial and axial direction, possesses relatively small frictional resistance.

At the one side of the roller bearing 55 there is positioned a schematically illustrated drive device 50 which, among other things, contains a stationary, first ring-shaped or ring element 51 and a driven second ring element 52. The firsr ring element 51 is operatively connected by means of uniformly circumferentially distributed fixing screws or bolts 53 at the outer ring or race 57 of the ball or roller bearing 55. The driven second ring element 52 is operatively connected by means of threaded bolts or screws 54 which are uniformly circumferentially distributively arranged and piercingly extend through the ring element 52, the inner race 56 of the roller or ball bearing as well as the second flange 76 of the shaft 75.

At the other side of the roller or ball bearing 55 there is arranged an angle measuring device 60 for the elevational movement in the direction of the double-headed arrow A. The angle measuring device 60 which is of conventional design and therefore only schematically illustrated is attached at the flange portion 57' of the outer ring or race 57 by means of threaded bolts or screws 61 or the like which are distributively arranged at the circumference.

Figure 4:
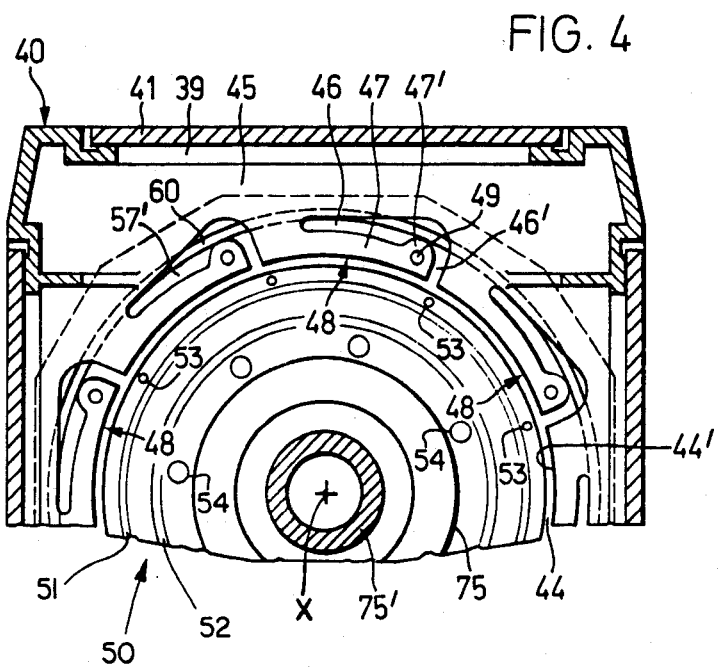
FIG. 4 is a cross-sectional view of the arrangement of FIG. 3, taken substantially along the line IV—IV thereof.

FIG. 4 is a fragmentary view of part of the housing 40 in section taken along the line IV—IV of FIG. 3. There will be recognised here a cover member 41 which closes an opening 39 providing access to the housing interior, and also there will be seen the inwardly directed wall 45 having the opening 44, the partially visible outer edge of the flange portion 57' as well as the outer edge of the angle measuring device 60 and a partial portion 75' of the shaft 75.

The wall 45 constructed for the attachment of the roller bearing-outer race 57 is provided at the circular-shaped inner side 44' of the opening 44 with circular-shaped extending spring elements 48 distributively arranged at the circumference. These spring elements 48 are bounded by an arc corresponding to the inner side or face 44', the centre of which arc or curved portion is located upon the rotational axis X of the shaft 75. Each individual spring element 48 is formed by a spring rod 47, a recess 46 extending essentially parallel to the inner side 44' and a slot 46' arranged transversely with respect to the recess 46 and separating the spring elements 48. The slot 46' therefore subdivides the spring or resilient elements 48 into individual segments. The transition of the recess 46 into the slot 46' is accomplished in the manner shown in FIG. 4, preferably with a parallel configuration into a reinforcement eyelet 47' provided at the front region of each spring rod 47. The eyelets 47' of the spring rods 47, and each of which is provided with a respective bore 49, preferably with a threaded bore, serve for receiving the threaded bolts 59 for the attachment of the roller bearing-outer race 57 at the wall 45 of the housing 40.

The construction of the outer race 57 with the flange portion 57' as well as the lateral arrangement, viewed in axial direction, at the wall 45 has the advantage that the outer race 57 does not require any exact fitting seat in the wall 45.

The slots 46' of the spring elements 48 are preferably machined following the machining of the reinforcement eyelets 47, for instance after drilling the threaded holes 49, by performing a milling or similar machining operation in the wall 45.

Finally, in FIGS. 3 and 4 there has been shown as an exemplary embodiment the one side of the housing 40 with the arrangement of the stress-free mounting of the shaft 75 in the wall 45 and as the same has been previously described in detail. However, at this point it is mentioned that both the other, here not further illustrated wall of the housing 40, which faces the receiver 27, and also the not particularly illustrated walls provided at the other housing 30, can be constructed with corresponding elements for the stress-free mounting.

While there are shown and described present preferred embodiments of the invention, it is to be distinctly understood that the invention is not limited thereto, but may be otherwise variously embodied and practiced within the scope of the following claims. Accordingly,

What I claim is:

1. An arrangement for the substantially stress-free mounting of a motor-driven shaft serving for the elevational movement of an optical device comprising:
   a first housing within which there is mounted said shaft;
   bearing means having an inner race, an outer race and a flange portion;
   said shaft being connected rigidly for rotation with said bearing means;
   a second housing;
   said optical device being pivotable about a lengthwise axis of the shaft and arranged between the first housing and the second housing;
   said first housing having a wall containing an opening;
   said outer race of the bearing means being non-rotatably supported by means of said flange portion, viewed in the axial direction of the shaft, laterally at said wall of said first housing;
   said housing wall being radially inwardly directed; and
   at least three radially effective spring elements uniformly distributively arranged at said wall of the first housing laterally non-rotatably supporting said outer race of the bearing means and spaced from one another by slot means.

2. The arrangement as defined in claim 1, wherein:
   a plurality of said spring elements are uniformly distributively arranged at the circumference of said opening;
   said opening of said housing wall containing an inner surface defining an arcuate structure;
   said spring elements being bounded at one side by said arcuate structure; and
   the center of said arcuate structure being located at the axis of rotation of the shaft.

3. The arrangement as defined in claim 1, wherein:
   each spring element comprises a spring rod;
   each spring element being bounded at one side by a recess which extends towards an inner surface of said opening essentially parallel to its circumferential direction and in the direction of an associated one of said slot means; and
   each of said slot means being arranged transversely with respect to the recess bounding the same.

4. The arrangement as defined in claim 3, wherein:
   the spring rod of each spring element is provided at a forward region thereof with a reinforcement eyelet located adjacent an associated one of the slot means; and
   said reinforcement eyelet being structured as a support surface and attachment for the outer race of said bearing means.

5. An arrangement for the substantially stress-free mounting of a motor-driven shaft serving for the elevational movement of an optical device comprising:
   a housing within which there is mounted said shaft;
   bearing means having an inner race, an outer race and a flange portion;
   means rigidly rotatably connecting said shaft with said inner race of said bearing means;
   said housing having a wall containing an opening;
   said outer race of the bearing means being non-rotatably supported by means of said flange portion, viewed in the axial direction of the shaft, laterally at said wall of said housing;
   said wall of the housing being radially inwardly directed; and
   a plurality of spaced radially effective spring elements uniformly distributively arranged at said wall of the housing non-rotatably supporting the outer race of said bearing means and spaced from one another by respective slot means.

6. The arrangement as defined in claim 5, wherein:
   each of said radially effective spring elements comprises a rod-like circumferentially extending segment.

7. The arrangement as defined in claim 6, wherein:
   each of said rod-like segments comprises a spring rod provided at a forward region thereof, adjacent an associated one of said slot means, with a reinforcement eyelet at which there is supported the outer race of said bearing means.

* * * * *